Witnesses
Wm. Geiger

Inventor
John F. O'Connor
By Geo. I. Haight
his Atty.

Feb. 8, 1927.
J. F. O'CONNOR
1,616,756
FRICTION SHOCK ABSORBING MECHANISM
Filed Nov. 11, 1922    2 Sheets-Sheet 2
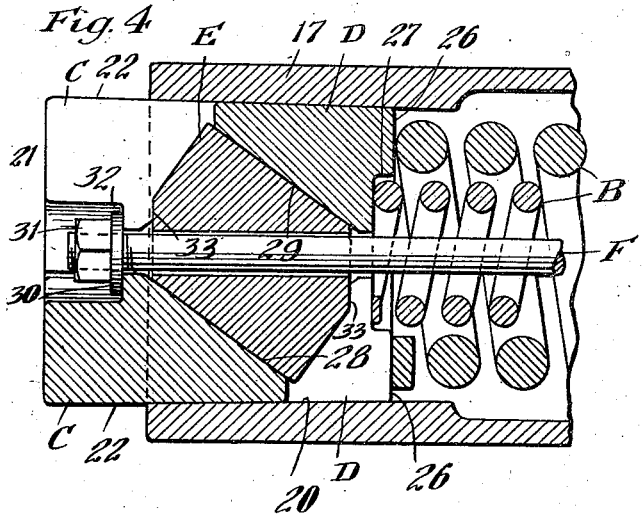
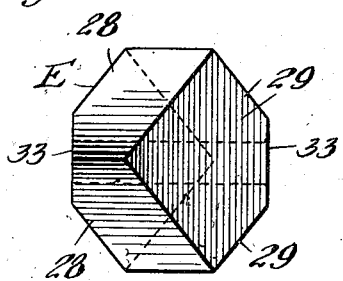
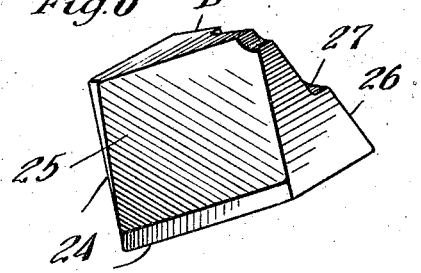
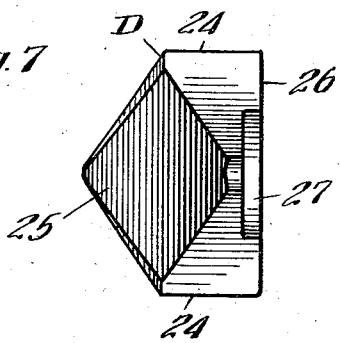
Witnesses
Wm. Geiger
Inventor
John F. O'Connor
By Geo. I. Haight
his Atty.

Patented Feb. 8, 1927.

1,616,756

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed November 11, 1922. Serial No. 600,228.

This invention relates to improvements in friction shock absorbing mechanisms.

One object of the invention is to provide a friction shock absorbing mechanism especially adapted for railway draft riggings and wherein are obtained high capacity and easy release, the mechanism employing a double wedge of exceedingly simple and economical form.

A specific object of the invention is to provide a friction mechanism of the character indicated wherein are employed two sets of oppositely arranged friction shoes with which cooperates a single wedge, the latter being in the form preferably of a right angle parallelopiped in order to reduce the cost of manufacture thereof.

Figure 1:
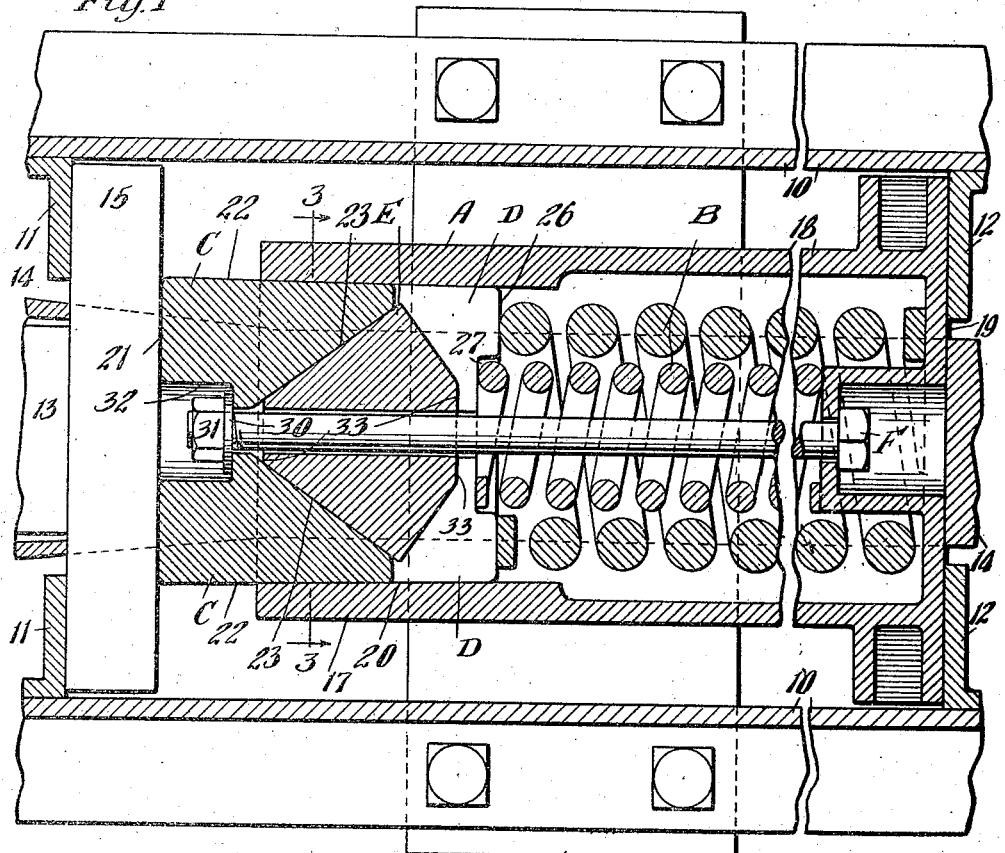
Figure 2:
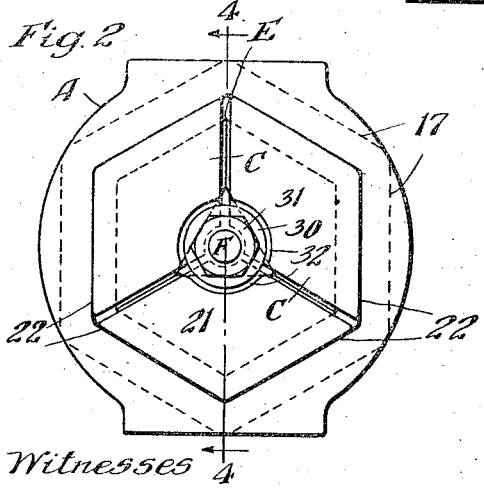
Figure 3:
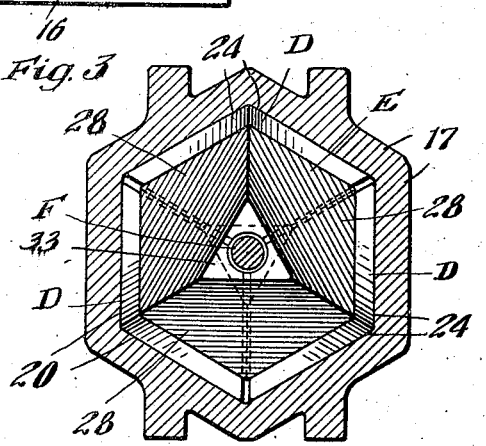

In the drawings forming a part of this specification, Figure 1 is a longitudinal sectional view of a portion of a railway draft rigging showing my improvements in connection therewith, the section through the friction elements corresponding to two intersecting planes at 120° apart, the balance of the figure being a true horizontal section. Figure 2 is a front end elevation of the shock absorbing mechanism proper. Figure 3 is a vertical transverse sectional view of the friction shock absorbing mechanism taken approximately on the section line 3—3 of Figure 1 but in which figure the front set of friction shoes is omitted in order to better illustrate the formation of the wedge. Figure 4 is a vertical longitudinal sectional view corresponding to the section line 4—4 of Figure 2. Figure 5 is a detail perspective of the double acting wedge employed in the mechanism. Figure 6 is a detail perspective of one of the inner friction shoes. And Figure 7 is an elevational view of the same shoe shown in Figure 6.

In said drawings, 10—10 denote channel draft sills of a car underframe, to the inner faces of which are secured front stop lugs 11 and rear stop lugs 12. A portion of a drawbar is indicated at 13, the same being operatively associated with a hooded cast yoke 14 within which are disposed the shock absorbing mechanism proper and a front follower 15. The yoke and parts therewithin are supported in operative position by a detachable saddle plate 16.

The improved shock absorbing mechanism proper, as shown, comprises a combined friction shell and spring cage casting A; a spring resistance B; an outer set of three friction shoes C—C; an inner set of three friction shoes D; a double-acting wedge E; and a retainer bolt F.

The casting A, as shown, is formed at its outer end with a hexagonal friction shell proper having six sides 17—17, and rearwardly of the shell proper, the casting A provides a spring cage or casing 18. At its rear end, the casting A has an integral wall 19 which is laterally extended and suitably reinforced so as to adapt it to cooperate with the rear stop lugs 12 in the manner of a rear follower. The inner sides of the shell wall 17 provide flat friction surfaces 20 which are converged slightly inwardly of the shell.

The three outer shoes C are of like construction. Each shoe C is formed at its outer end with a transversely extending flat face 21 which bears upon the front follower 15. On its side, each shoe C is provided with two intersecting flat friction surfaces 22—22 cooperable with two intersecting shell surfaces 20 of the hexagonal shell. As will be obvious, said surfaces 22—22 and the surfaces 20—20 intersect each other at an angle of 120°. On its inner side, each shoe C is provided with a flat wedge face 23 of approximately square area. Said wedge faces 23 diverge rearwardly of the shell. Each of the inner shoes D (see particularly Figures 6 and 7) is formed with two flat friction surfaces 24—24 which intersect and are arranged to cooperate with two intersecting shell surfaces 20. The shoes D, as will be seen from an inspection of Figures 1 and 3, are alternated with respect to the outer shoes D; that is, the intersecting ridges of the shoes C will engage with alternate corners of the shell and the intersecting ridges of the shoes D will engage with the remaining corners of the shell. Each shoe D is further provided with a flat wedge face 25 of approximately square outline, said wedge faces 25 diverging outwardly of the shell. At its inner end, each shoe D is formed with a flat bearing face 26 for the outer coil of the spring and is slightly recessed as indicated at 27 to form a seat for the inner coil of the spring.

The wedge E is made in the form of a right-angle parallelopiped preferably in the form of a cube so that it has three wedge faces 28—28 which diverge rearwardly, as shown in Figure 3, and three other wedge faces 29—29 which diverge outwardly of the shell. As will be evident, each of said wedge faces 28 and 29 is rectangular and flat so that the wedge may be finished to proper size and shape by means of very simple machine operations, should machining be necessary in truing the casting. In placing the wedge E in the mechanism, one diagonal thereof will coincide with the axis of the mechanism so that the three wedge faces 28, which will then be on the forward side of the wedge, will cooperate with the wedge faces 23 of the three outer shoes C and correspondingly the three inner wedge faces 29 will cooperate with the wedge faces 25 of the inner shoes D. The arrangement of the wedge as above described will obviously cause the wedge faces 29 to be staggered with respect to the wedge faces 28 when considered with relation to the axis of the mechanism.

The retainer bolt F is anchored at its inner end within a hollow boss formed integral with the casting A and at its forward end is anchored by means of a washer 30 and nut 31 within a suitable recess provided by cut-outs 32 in the meeting edges of the shoes C. The wedge E is suitably apertured diagonally to accommodate the shank of the bolt and preferably the inner and outer axially alined corners of the wedge E will be partially cut off to provide flat ends 33—33 and thus avoid thin weak sections of metal which would otherwise result on account of the opening for the shank of the bolt.

The operation of the device, assuming a compression stroke under buff is as follows. As the front follower 15 is moved inwardly, the shoes C are compelled to travel in unison therewith, this action being resisted primarily by the wedge E. The latter in turn wedges against the inner shoes D which are yieldingly resisted by the spring B. Due to the slight taper of the shell, there will be a slight differential action which will cause the wedge E to advance at a slightly faster rate than the shoes C and the shoes D to advance at a slightly faster rate than the wedge E. By staggering or alternating the friction shoes of the two sets and correspondingly staggering or alternating the inner and outer sets of wedge faces of the wedge E, it will be observed that I obtain a uniformly distributed radial or outward pressure around the entire circumference of the hexagonal, thus minimizing any tendency of the shell to become distorted.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a friction shell having interior friction surfaces; of a spring resistance; a set of outer friction shoes having inwardly diverging wedge faces; a set of inner friction shoes having outwardly diverging wedge faces; and a cube-shaped wedge interposed between and cooperable with the wedge faces of said two sets of shoes, a diagonal of the said cube being so disposed as to coincide with the longitudinal central axis of the shell.

2. In a friction shock absorbing mechanism, the combination with a friction shell having an interior of hexagonal cross section providing six longitudinally extending friction surfaces; of a spring resistance; a set of three outer pressure-receiving and transmitting friction shoes each having an outer pair of intersecting friction surfaces cooperable with two adjacent shell friction surfaces and provided also with an inner wedge face extending inwardly of the shell and away from the axis thereof; a set of three inner friction shoes each having a pair of outer intersecting friction surfaces cooperable with two adjacent shell friction surfaces and provided also with a wedge face extending outwardly and away from the axis of the shell; and a parallelopiped wedge interposed between and cooperable with the wedge faces of the two sets of friction shoes, said parallelopiped wedge having one diagonal thereof substantially coinciding with the longitudinal, central axis of the shell whereby the three front wedge faces provided by said wedge will be circumferentially staggered with respect to the other three rear wedge faces of the wedge with a corresponding staggering of the shoes of the inner and outer sets.

In witness that I claim the foregoing I have hereunto subscribed my name this 7th day of October, 1922.

JOHN F. O'CONNOR.